J. ELDER.
Whiffletree.
No. 48,163.
Patented June 13. 1865.
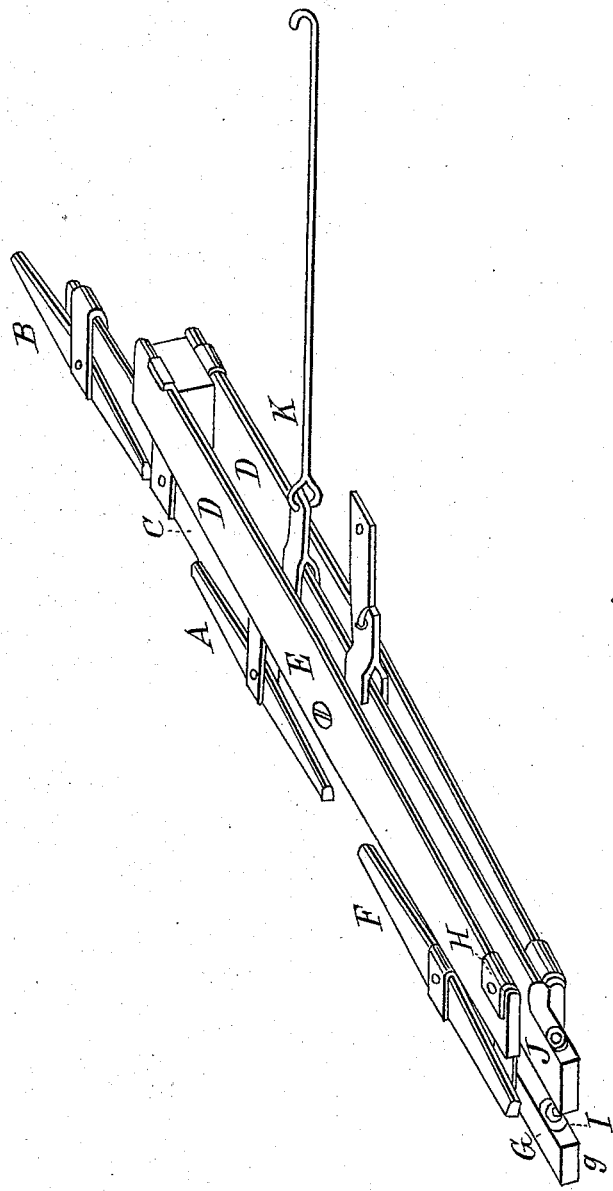
Witnesses:
Chas D Smith
Edward H Knight
Inventor:
J. Elder
by Munn & Co
Attorneys

UNITED STATES PATENT OFFICE.

JAMES ELDER, OF CARTHAGE, ILLINOIS.

IMPROVEMENT IN WHIFFLETREES.

Specification forming part of Letters Patent No. 48,163, dated June 13, 1865.

*To all whom it may concern:*

Be it known that I, JAMES ELDER, of Carthage, in the county of Hancock and State of Illinois, have invented certain new and useful Improvements in Whiffletrees; and I do hereby declare the following to be a full, clear, and exact description of the nature, construction, and operation of the same, reference being had to the accompanying drawing, which is made part of this specification, and in which my improvements are represented by a perspective view.

A B are the single-trees attached to the double-tree C, and are designed for a span of horses. This double-tree C is attached by a clip or clevis to the treble-tree D, and E is the wagon-hammer, clevis-pin, or point of draft of the treble-tree D, which is attached, by clevis-opening or otherwise, to the plow or other implement, as may be desired. The single or third horse is attached by the single-tree F, adjustable lever G, and clip or clevis H, to the end of the treble-tree D, and by way of giving the single horse the advantage of leverage the end $g$ of the lever G is attached by a link, I, to a lever, J, which has two points of suspension—namely, the hammer or clevis-pin E and the rod K, which is hitched back to the implement so as to make the lever J and fulcrum-point $g$ of the lever G rigid.

The point of advantage which the single horse has consists in its being hitched to the longer arm of the second-class lever G, whose fulcrum is $g$, and which is attached by clevis or clip H to the off end of the double-tree. According to the comparative strength of the single horse the clevis of its single-tree may be attached to either of the holes in the end of the lever G, and its strength is exerted upon lever G to keep the near end of the treble-tree in position, while the strength of the span of horses drawing upon the off end of the treble-tree tends to vibrate the treble-tree on the pivoted point E. By means of this arrangement the pivoted point of the treble-tree may be midway of its length, while sufficient advantage of leverage may be allowed the single horse by the mode of its attachment to its end of the treble-tree to give it a fair chance in the team of three horses.

Having thus described my invention, what I claim therein as new, and desire to secure by Letters Patent, is—

The combination of the adjustable lever G, lever J, and rod K with the treble-tree D for equalizing the draft upon the horses of the team, substantially as described.

JAMES ELDER.

Witnesses:
GEO. M. BATCHELDER,
DAVID MACK.